Patented Dec. 12, 1933

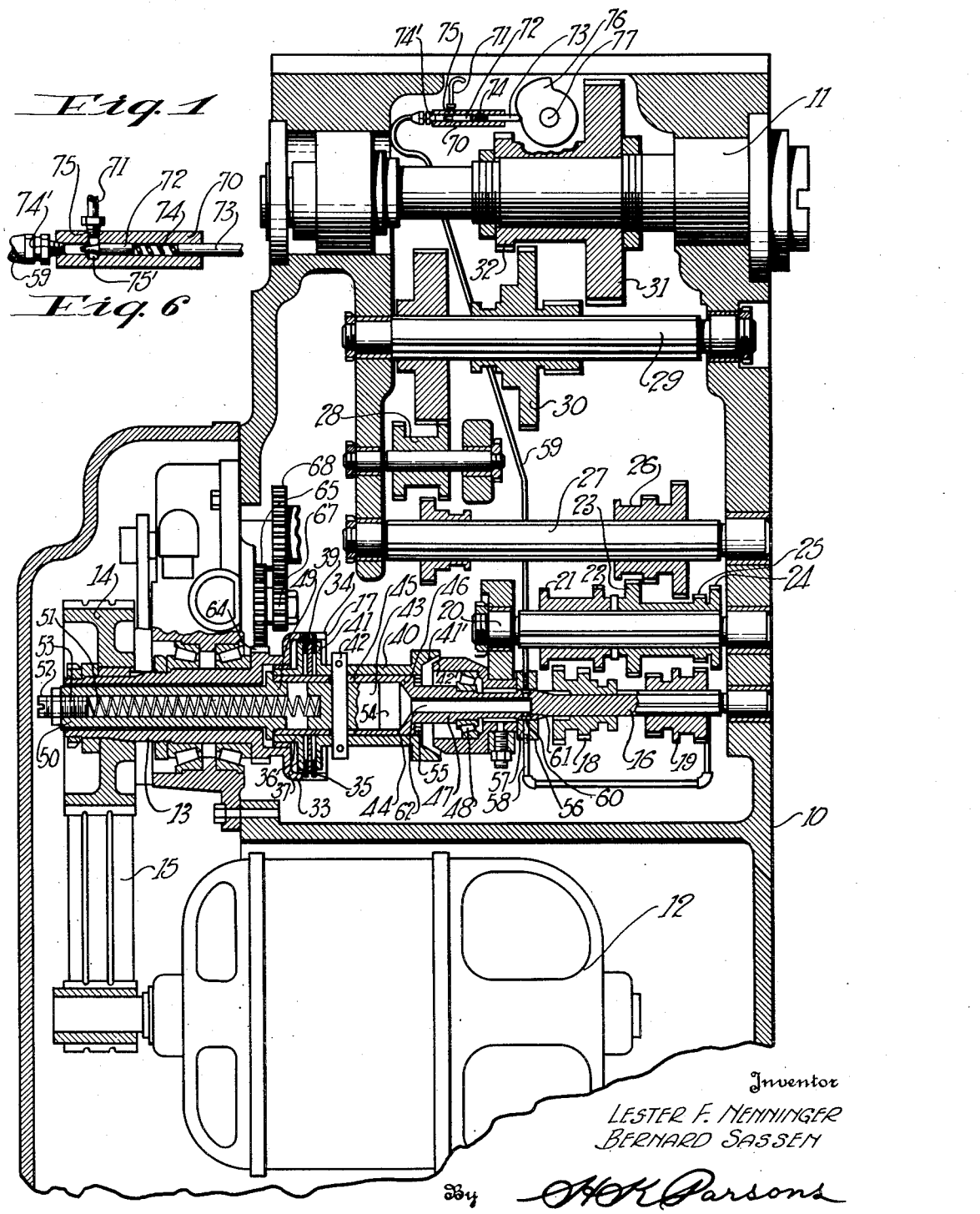

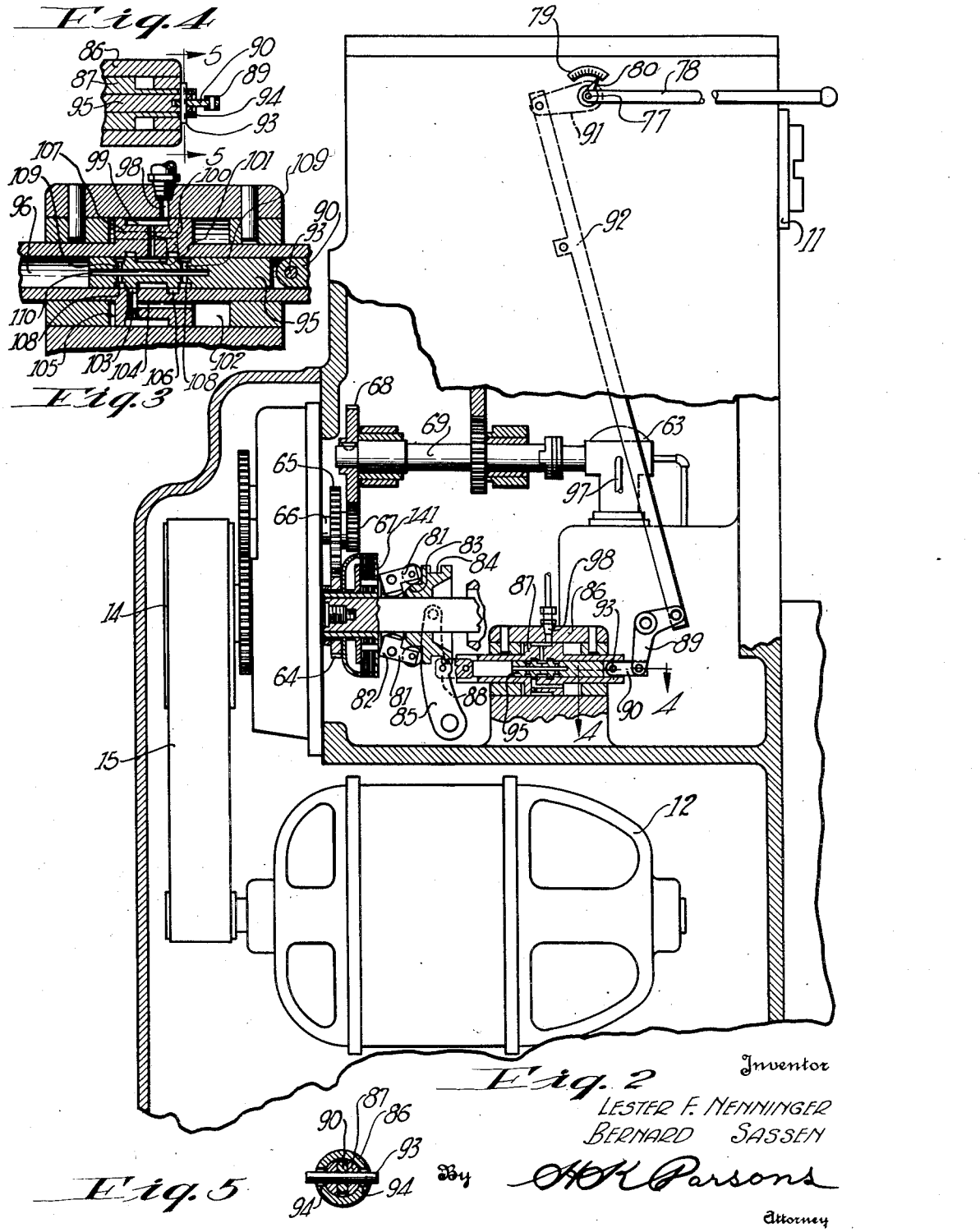

1,938,780

UNITED STATES PATENT OFFICE 1,938,780

POWER OPERATED CLUTCH FOR MACHINE TOOLS

Lester F. Nenninger and Bernard Sassen, Cincinnati, Ohio, assignors to The Cincinnati Milling Machine Company, Cincinnati, Ohio, a corporation of Ohio Application December 2, 1930. Serial No. 499,519

10 Claims. (Cl. 192—85)

This invention relates to clutch mechanisms and more particularly to improved actuating and control mechanisms therefor.

One of the principal objects of this invention is to provide a power operated clutch for machine tools, such as milling machines, grinding machines, and the like, whereby engagement and disengagement thereof may be effected with little effort on the part of the operator.

Another object of this invention is to provide a power operated clutch in which the effective engagement thereof may be varied so that large amounts of power may be transmitted to the driven member without slippage or that small amounts of power may be transmitted to the driven member with the clutch acting as an over-load or safety device.

A further object of this invention is to provide improved hydraulic actuating means for clutch mechanisms whereby the pressure of engagement may be easily controlled and maintained.

A still further object of this invention is to provide hydraulic actuating means for clutch mechanisms in which the pressure of engagement may be varied; and indicating means whereby the operator may determine the amount of retaining pressure.

Other objects and advantages of the present invention should be readily apparent by reference to the following specification considered in conjunction with the accompanying drawings, illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts.

Figure 1 is a vertical section through a machine tool showing one embodiment of the present invention.

Figure 2 is a vertical section showing another embodiment of the invention.

Figure 3 is an enlarged view of the valve mechanism shown in Figure 2.

Figure 4 is a section on the line 4—4 of Figure 2.

Figure 5 is a section on the line 5—5 of Figure 4.

Figure 6 is an enlarged view of the control valve shown in Figure 1.

For the purposes of illustration the invention has been applied to a machine tool, such as shown in Figure 1, in which the reference numeral 10 indicates the column of such machine having rotatably mounted in the upper portion thereof a driven member, such as the spindle 11, suitable for rotating a cutting tool or the like, and a prime mover 12, such as an electric motor, located in the base of the column. A transmission, including a starting clutch, extends from the prime mover to the spindle for imparting rotation thereto and comprises the sleeve 13 journaled in the column having a pulley 14 secured to the end thereof for receiving power from the prime mover through the belt 15. The sleeve 13 drives the main shaft 16 through a starting clutch indicated generally by the reference numeral 17. Shiftable gear couplets 18 and 19 are slidably mounted on the shaft 16 for imparting selective rates of rotation to the shaft 20 through gears 21, 22, 23 and 24 fixed therewith. The gears 23 and 25 are adapted to mesh with the shiftable gear couplet 26 for imparting eight different rates of rotation to the shaft 27 upon which it is slidably mounted. A reverser 28 is interposed between the shaft 27 and a shaft 29 parallel therewith for changing the direction of movement of the driven member. The shaft 29 has the shiftable gear couplet 30 slidably mounted thereon for engagement with either the gears 31 or 32 secured to the spindle. Engagement of the starting clutch will permit the transmission of power from the prime mover 12 to the spindle through the variable speed transmission while disengagement will stop rotation thereof.

The clutch 17 comprises the spider 33 formed integral on the end of the sleeve 13 having arms 34 for receiving the major clutch plates 35. A tubular member 36 is mounted for free rotation in the sleeve 13 and has a flange 37 between which and a clamp plate 40 are the inner clutch plates 39 mounted intermediate the major clutch plates. The clutch clamping member 40 having a flange 41 for exerting pressure against the clutch plates to effect motion transmission is secured for sliding adjustment by means of the transverse pin 42 to its actuating piston 43. The other end of the member 40 has a cone shaped flange 41' for engaging the complementary shaped projection 42' integral with the column of the machine upon release of the clutch, the parts acting as a brake to retard movement of the driven parts. The piston is slidably mounted in the cylinder 44 which has elongated slots 45 formed in the cylindrical surface thereof for the passage of the pin 42. The cylinder head 46 has a reduced extension to form the journal 47 mounted in the antifriction bearing 48. The other cylinder head 49 has an elongated reduced tubular extension 50 through which passes a compression spring 51 interposed between the piston 43 and the adjusting screw 52 threaded in the end of the tubular portion 50. A venthole 53 is formed through the center of the screw whereby, upon the admission of pressure to the chamber 54 of the cylinder, air or fluid leakage that may be in the opposite chamber of the cylinder may be exhausted and not impede the movement of the piston.

The cylinder is provided with longitudinal ribs on its exterior surface in the form of gear teeth which mesh with similar gear teeth 55 formed in the bores of the clutch members 36, 39 and 40. Thus when the members are rotated, upon engagement of the clutch, power will be transmitted to rotate the cylinder without strain or tension on the pin 42. The reduced portion of the cylinder head 46 is extended through the bearing 48 and integrally connected with the shaft 16. A collar 56 surrounds the shaft 16 and is provided with diametrically opposite bores 57, in one of which is threaded the in-take pipe 58 and in the other the outlet pipe 59. The collar 56 is journaled on the shaft 16 and is held from rotation by means of the pipes 58 and 59. The shaft 16 is provided with an annular groove 60 registering with the bores 57 and has formed in the bottom thereof radial ports 61 communicating with the axial bore 62 leading to the chamber 54 of the cylinder.

Fluid pressure is supplied to the channel 58 from a suitable source of pressure, such as a pump 63 illustrated in Figure 2, having a pressure outlet 97 which may be connected to the pipe 58. The pump is constantly driven from the prime mover through gear 64 integral with the sleeve 13 which meshes with the gear 65 on the stub shaft 66 having the pinion 67 keyed thereto and engaging the gear 68 secured to the end of the pump drive shaft 69.

The channel 59 leads to the control valve 70 having the outlet 71 which may be utilized for supplying fluid to a lubricating system. Slidably mounted within the valve are two plungers 72 and 73 having a spring 74 interposed between them. The plunger 72 serves as a relief valve to the pressure ahead of it and permits the flow from the pump not utilized to actuate the piston to escape through the annular groove 75' to the outlet 71. A cam 76 is secured to the end of the shaft 77 journaled in the upper part of the column and provided on the exterior end thereof with a starting lever 78, such as shown in Figure 2. Rotation of the lever will cause rotation of the cam which in turn will gradually compress the spring 74 and thereby cause the pressure in the line 59 to build up. This increase in pressure will be communicated eventually to the chamber 44 of the cylinder causing movement of the piston 43 to the left which in turn will cause movement of the clutch clamping plate 40 to the left through the medium of pin 42 increasing the compression of spring 51. This will result in motion being transmitted from the constantly rotating spider 33 to the clutch clamping member which in turn, through the teeth 55, will impart rotation to the cylinder 44 and elongated cylinder head 46 and thereby impart rotation to the shaft 16. During this rotative movement it will be noted that, due to the annular groove 51, pressure communication will always be maintained between the pump and the cylinder.

Upon movement of the handle 78 in the opposite direction the compression of spring 74 will be gradually diminished thereby reducing the pressure in chamber 54 and the spring 51 will come into action to cause the piston 43 to follow up the drop in pressure and thereby effect disengagement of the clutch as the pressure drops. When the clutch is completely disengaged the cone shaped flange 41' comes into engagement with 42' and due to the pressure of the spring 51 which is still under considerable compression a braking force will be imparted to the shaft 16, to hasten or expedite the slowing down process.

In the multiple disk type of clutch, which has been shown for illustrative purposes, it is apparent that the greater the pressure the greater the power transmitting capacity of the clutch and by the use of hydraulic pressure the effective engagement of the clutch may be varied so that if it is desired to positively transmit a large amount of power greater pressure may be exerted upon the clutch while under other circumstances, due to weaknesses of cutter or material, it may be desirable to limit the power transmitting capacity of the clutch to insure against breakage of the parts and in such a case the clutch engaging pressure may be light thereby permitting slippage of the clutch when the over-load point has been reached. The contour of the cam may be involute to give a uniform rise in pressure or it may be given other contours to produce a variable rise in pressure according to the results desired.

An indicator plate 79 may be associated with a pointer 80 fixed with the lever 78 for rotation therewith, having proper indicia thereon whereby the amount of clutch engagement may be indicated to the operator.

In Figure 2 a modified form of the invention is illustrated in which the clutch clamping member 141 is operated by pivoted fingers 81 having cams 82 and operated by the ring cam 83 having a spool 84 formed in the periphery thereof and engaged by the shifting lever 85. The shifting lever is adapted to be oscillated by an hydraulic motor, indicated generally by the reference numeral 86 having slidably mounted thereon a piston 87, one end of which is attached to the lever 85 by the link 88 and the other end attached to the bell crank 89 by means of the link 90. The bell crank is adapted to be operatively connected with the control lever 78 through a crank 91 keyed to the shaft 77 and connecting link 92. The link 90 is connected to the piston 87 by means of the cross pin 93 extending into elongated slots 94 whereby a certain amount of lost motion is provided between the link 90 and the piston 87. The link 90 is also positively connected to the valve member 95 by the pin 93, the valve member being slidably mounted in an interior bore 96 formed in the piston 87. The piston is adapted to be moved or reciprocated by fluid pressure, such as hydraulic means, which may be conveyed to the motor through channel 97 which may be supplied from the pump 63 through suitable means. The channel 97 is connected to a port 98 communicating with an annular groove 99 formed in the periphery of the piston 87 and of sufficient width to maintain said communication during all reciprocating movements thereof. A radial channel 100 supplies pressure to an annular groove 101 formed in the periphery of the valve plunger 95. The motor chamber 102 is permanently connected to an annular groove 103 formed on the interior of the bore 96 by means of the channel 104 while the chamber 105 is connected to the annular groove 106 by means of channel 107. The valve 95 is further provided with a pair of exhaust annular grooves 108 which communicate by means of radial channels 109 with the outlet channel 110.

The pump 63 is constantly driven during rotation of the prime mover and the channel 97 is, therefore, under constant pressure which supplies and maintains the annular groove 101 of the valve under constant pressure through port 98, annular groove 99 and radial channel 100. With the parts in the position shown in Figure 3 it will be seen that movement of the valve 95 to the left, as viewed in that figure, will permit pressure from the annular groove 101 to flow to the annular groove 103 and thence through channel 104 to the chamber 102. This will cause movement of the piston 87 to the left and in such amount that the groove 103 will be moved out of registry with the annular groove 100 and the parts will again come to rest. When pressure flows to the chamber 102 fluid in chamber 105 must be exhausted in order to permit movement and in this case the fluid will flow through channel 107 to annular groove 106 of the piston which will then be in registry with the annular groove 108 in the valve which, by means of the radial port 109 and longitudinal channel 110, will permit the fluid to be exhausted. Movement of the valve 95 to the right will effect a reverse flow in the channel 104 and channel 107 causing movement of the piston 87 to the right which will effect disengagement of the clutch. From the foregoing it should be apparent that movement of the valve member to the right or left by means of the control lever 78 will cause the piston 87 to follow up such movement and effect engagement or disengagement of the clutch. Thus by the substantially effortless movement of the valve member great pressure may be caused to be exerted and maintained in engaging the clutch.

The lost motion between the pin 93 and the piston 87, previously referred to, permits manual movement of the piston 87, if for any reason, the fluid pressure should fail. Attention is invited to the fact that the pin 93 also extends sufficiently beyond the member 87, as shown in Figure 5, so that upon inward movement it will engage the surface of the motor 86 and thereby limit its inward movement.

From the foregoing it should now be apparent that a clutch actuating and control mechanism has been provided suitable for use in connection with a starting clutch of a machine tool, such as a milling machine, grinding machine, or the like, whereby apparently effortless engagement and disengagement of the clutch may be effected and in which the amount of clutch engagement, or in other words, the power transmitting capacity of the clutch may be varied within suitable limits to insure the positive transmission of a large amount of power or the transmission of a small amount of power with the clutch acting as an over-load or safety device. Indicating means have also been provided whereby the operator may easily and quickly ascertain the amount of clutch engagement when setting the same. In addition it will be noted that braking mechanism has been provided whereby the rate of retardation of the moving parts after clutch disengagement may be suitably controlled by the operator.

That which is claimed is:

1. A machine tool having a prime mover, a movable part, a clutch for coupling the part with the prime mover for actuation thereof, hydraulic means for effecting engagement of said clutch, and means to control the pressure of said hydraulic means and thereby the effective coupling of the clutch including a control valve movable to cause said hydraulic means to effect engagement of the clutch and simultaneously limit the effect of said means to thereby determine the pressure of engagement of the clutch, an oscillatable control lever coupled with the valve to cause gradual movement of the valve in one direction to increase the pressure of engagement, and in the other direction to decrease the pressure of engagement and an indicator associated with said lever to indicate the amount of effected engagement.

2. A machine tool having a prime mover, a movable part, a starting clutch, hydraulic means for effecting engagement of said clutch to couple the part with the prime mover for actuation thereof including a piston and cylinder, one of which is connected to said clutch, and means to control the pressure in said cylinder and thereby the effective coupling of said clutch, including an escapement valve and cam means for controlling the amount of said escapement.

3. A machine tool having a movable part, a prime mover, a clutch for coupling the part with the prime mover for actuation thereof, an hydraulic servo motor for actuating said clutch having a piston operatively connected with the clutch, a valve, operating means for the valve to determine movement of the piston, and a lost motion connection between said operating means and the piston whereby the clutch may be manually operated during inactivity of the hydraulic actuating means.

4. A machine tool having a movable part, a prime mover, a clutch for coupling the part with the prime mover for actuation thereof, a clutch actuating hydraulic motor, a constantly discharging pump actuated by the prime mover, means to connect said pump with a lubricating system through said motor, and means to limit the discharge to the lubricating system to thereby increase the pressure in the motor to effect engagement of the clutch, and means to further limit said discharge to increase the pressure of clutch engagement.

5. A machine tool having a movable part, a prime mover, a clutch for coupling the part with the prime mover for actuation thereof, a clutch actuating hydraulic motor, a constantly discharging pump actuated by the prime mover, means to connect said pump with a lubricating system through said motor, and means to limit the discharge to the lubricating system to thereby increase the pressure in the motor to effect engagement of the clutch, said limiting means comprising a cam having a contour for uniformly increasing the pressure in said motor.

6. In a device of the class described, a constantly rotating hollow drive shaft terminating in a clutch member, a cylindrical member mounted in the hollow of said shaft and having a portion projecting beyond the end of the shaft, a bearing for the outboard end of said projection, a cylinder formed in the interior of the projection, a sleeve splined on the exterior of the projection, said sleeve having a clutch member formed on the end thereof couplable with the first clutch member, a piston reciprocably mounted in the cylinder, means connecting the piston to said sleeve for joint movement, a source of pressure means coupling the pressure to said cylinder to effect engagement of said clutch members and escapement control means for the pressure to vary the amount of clutch engagement.

7. In a milling machine having a spindle, a prime mover, and a variable speed transmission permanently coupled with the spindle, of means to couple the transmission with the prime mover for actuation of the spindle including a clutch, a piston and cylinder, one of which is connected to the clutch, means to supply pressure to the cylinder to operate the clutch comprising a pump continuously actuated by the prime mover, an escapement control valve for determining said pressure, a manual operating lever for the valve said lever being rotatable through a pre-determined angle from a stop position to effect initial engagement of the clutch and further rotatable to vary the pressure of engagement, and means associated with the lever to indicate the driving relationship of the clutch.

8. In a milling machine having a spindle, a prime mover, and a variable speed transmission permanently coupled with the spindle, of means to couple the transmission with the prime mover for actuation of the spindle including a clutch, a piston and cylinder, one of which is connected to the clutch, means to supply fluid pressure to the cylinder to operate the clutch comprising a pump continuously actuated by the prime mover, an escapement control valve for determining said pressure, a manual operating lever for the valve, said lever being rotatable through a pre-determined angle from a stop position to effect initial engagement of the clutch and further rotatable to vary the pressure of engagement, means associated with the lever to indicate the amount of clutch engagement, additional operating means for disengaging the clutch upon return movement of the lever to stop position, and braking means actuable by said operating means after clutch disengagement to stop the spindle.

9. In a milling machine having a column, a cutter spindle journaled in the column, a transmission mounted in the column for imparting a plurality of speeds to the spindle varying progressively from a low to a high rate, and a prime mover, of means to couple the prime mover to the transmission in varying power transmitting capacities corresponding to the speed rate of the spindle, whereby the power transmitting capacity will be low when the spindle rate is high and high when the spindle rate is low, comprising an hydraulically actuated clutch, a source of pressure, a control valve for coupling the pressure to said clutch and determining the amount of said pressure, and a manual valve operating lever mounted adjacent said spindle on the column for actuation by the operator when in a cutter observing position.

10. In a milling machine having a column, a cutter spindle journaled in the column, a transmission mounted in the column for imparting a plurality of speeds to the spindle varying progressively from a low to a high rate, and a prime mover couplable with the transmission for effecting power rotation of the spindle the torque of which will vary inversely as its rate, of a clutch to couple the prime mover to the transmission in varying torque transmitting capacities, means to vary the pressure in the clutch, and thereby the torque transmitting capacity thereof, whereby low clutch torques may be utilized with high spindle speeds and high clutch torques with low spindle speeds, comprising hydraulically actuated clutch operating means, a source of hydraulic pressure, valve means for controlling and varying the application of pressure to said means, a valve operating lever mounted on the column adjacent the cutter spindle for actuation by the operator from a cutter observing position and indicator means associated with the lever whereby the operator may set the power transmitting capacity of the clutch in accordance with the spindle speed.

LESTER F. NENNINGER.
BERNARD SASSEN.